(12) United States Patent
Hultell et al.

(10) Patent No.: US 9,385,796 B2
(45) Date of Patent: Jul. 5, 2016

(54) METHOD, USER EQUIPMENT, COMPUTER PROGRAM AND COMPUTER PROGRAM PRODUCT FOR SELECTING AN OUTPUT STREAM

(75) Inventors: Johan Hultell, Solna (SE); Johan Bergman, Stockholm (SE); Mats Blomgren, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1109 days.

(21) Appl. No.: 13/383,687

(22) PCT Filed: Dec. 30, 2011

(86) PCT No.: PCT/EP2011/074279
§ 371 (c)(1),
(2), (4) Date: Jan. 12, 2012

(87) PCT Pub. No.: WO2012/093074
PCT Pub. Date: Jul. 12, 2012

(65) Prior Publication Data
US 2012/0188960 A1   Jul. 26, 2012

Related U.S. Application Data

(60) Provisional application No. 61/429,503, filed on Jan. 4, 2011.

(51) Int. Cl.
*H04B 7/06* (2006.01)
*H04B 7/04* (2006.01)
*H04W 52/14* (2009.01)
*H04W 52/28* (2009.01)
*H04W 52/42* (2009.01)

(52) U.S. Cl.
CPC ............. *H04B 7/06* (2013.01); *H04B 7/0404* (2013.01); *H04B 7/0486* (2013.01); *H04W 52/146* (2013.01); *H04W 52/286* (2013.01); *H04W 52/42* (2013.01)

(58) Field of Classification Search
CPC .......... H03F 1/3247; H03F 2201/3231; H04B 7/0404; H04B 7/0486; H04B 7/06
See application file for complete search history.

(56) References Cited

U.S. PATENT DOCUMENTS

2002/0012395 A1* 1/2002 Song et al. ............... 375/240.03
2003/0177257 A1* 9/2003 Relan ............................ 709/236
2006/0156087 A1* 7/2006 Lin et al. ....................... 714/713

(Continued)

OTHER PUBLICATIONS

Qualcomm Incorporated, "Introduction to UL MIMO in HSPA", 3GPP TSG RAN WG1 Meeting #63, pp. 1-10, Jacksonville, USA, Nov. 10, 2010, R1-106336.

(Continued)

*Primary Examiner* — Khaled Kassim
(74) *Attorney, Agent, or Firm* — Coats & Bennett, PLLC

(57) ABSTRACT

It is presented a method for selecting an output stream for bits of a bit set. The method comprises the steps of: obtaining indicators of how much transmission power is allowed to be used; calculating a maximum number of bits that can be provided to each one of the two output streams; determining which one of the two output streams is to be a primary output stream and which one of the two output streams is to be the secondary output stream. The primary output stream is then filled first and any surplus is provided to the secondary output stream. A corresponding user equipment, computer program and computer program product are also presented.

19 Claims, 3 Drawing Sheets

(56) References Cited

U.S. PATENT DOCUMENTS

| | | | |
|---|---|---|---|
| 2007/0258487 A1* | 11/2007 | Puputti | 370/474 |
| 2008/0101410 A1* | 5/2008 | Barkley et al. | 370/473 |
| 2009/0267810 A1* | 10/2009 | Schneider | 341/50 |
| 2010/0153692 A1* | 6/2010 | Kota et al. | 712/222 |
| 2011/0098076 A1* | 4/2011 | Kim et al. | 455/522 |
| 2011/0263281 A1* | 10/2011 | Cai et al. | 455/501 |
| 2012/0177089 A1* | 7/2012 | Pelletier et al. | 375/219 |
| 2012/0281642 A1* | 11/2012 | Sambhwani et al. | 370/329 |
| 2012/0287868 A1* | 11/2012 | Sambhwani et al. | 370/329 |
| 2012/0287965 A1* | 11/2012 | Sambhwani et al. | 375/141 |
| 2013/0329663 A1* | 12/2013 | Pelletier et al. | 370/329 |
| 2014/0226735 A1* | 8/2014 | Zhang et al. | 375/260 |

OTHER PUBLICATIONS

Ericsson, et al., "Closed loop transmit diversity for HSUPA", 3GPP TSG RAN WG1 Meeting #62bis, Xi'an, P.R. China, Oct. 6, 2010, R1-106475.

* cited by examiner

METHOD, USER EQUIPMENT, COMPUTER PROGRAM AND COMPUTER PROGRAM PRODUCT FOR SELECTING AN OUTPUT STREAM

TECHNICAL FIELD

The present invention relates to the field of telecommunications, and more precisely to uplink MIMO (multiple input multiple output) transmissions.

BACKGROUND

During 2009 and 2010, the third generation partnership project (3GPP) evaluated open loop beam forming and open loop antenna switching for uplink transmissions in WCDMA/HSPA (Wideband Code Division Multiple Access/High-Speed Packet Access). Both of these techniques are based on that a UE (User Equipment) with multiple transmit antennas exploits the existing feedback, e.g. F-DPCH (Fractional Dedicated Physical Channel) or E-HICH (E-DCH (Enhanced Dedicated Channel) HARQ (Hybrid Automatic Repeat reQuest) Acknowledgement Indicator Channel) to determine a suitable pre-coding vector in an autonomous fashion with the purpose of maximizing the signal quality, e.g. the signal to noise plus interference ratio (SIR), at the receiving Node-B(s). Since the network is unaware of the pre-coding weights that are applied by the UE, the Node-Bs will experience a discontinuity in the measured power level when a change in pre-coding weights occurs.

Recently, there have been proposals for introducing closed loop transmit diversity for WCDMA/HSPA and in [3] a work item was agreed. Contrary to the open loop techniques where the UE decides pre-coding weights, closed loop techniques are based on that the network, e.g. the serving Node-B selects the suitable pre-coding vector with which the signal is multiplied. In order to signal the necessary feedback information from the network to the UE, the Node-B can either rely on one of the existing physical channels (e.g. F-DPCH) or a new feedback channel could be introduced.

Uplink multiple-input-multiple-output (MIMO) transmission is another multi-antenna transmission technique that has been proposed as a Rel-11 candidate for WCDMA/HSPA and in [4] a study item description was agreed. In uplink MIMO transmissions, different data is transmitted from different virtual antennas. It should be noted that closed loop beam forming can be viewed as a special case of uplink MIMO where no data is scheduled on one of the virtual antennas.

SUMMARY

The embodiments presented herein eliminate or at least alleviate the problems described above.

In a first aspect, it is presented a method for selecting an output stream for bits of a bit set, the method being performed in a user equipment of a mobile communication network. The method comprises the steps of: obtaining indicators of how much transmission power is allowed to be used for each one of two output streams; calculating a maximum number of bits that can be provided to each one of the two output streams in a preconfigured time period, based on the indicators; determining which one of the two output streams is to be a primary output stream and which one of the two output streams is to be the secondary output stream; when the maximum number of bits that can be provided to the primary output stream is greater or equal to the number of bits in the bit set, supplying the bit set to the primary output stream; and when the maximum number of bits that can be provided to the primary output stream is less than the number of bits in the bit set, filling the primary output stream with bits from the bit set and providing the surplus of the bit set to the secondary output stream.

Using this method, only one output stream is used if the capacity allows. This reduces any interference between output streams. Moreover, similar power levels are achieved over time for the two output streams which reduces unwanted fluctuations in interference estimates. This leads to better data transmission quality.

The primary output stream and the secondary output stream may be provided to a multiple input multiple output, MIMO, transmitter comprising at least two transmitter antennas.

The preconfigured time period may be the duration of one sub-frame for High Speed Uplink Packet Access.

The step of obtaining indicators of how much transmission power is allowed to be used may comprise receiving a serving grant from a serving Node-B.

The serving grant may be a combined serving grant for both output streams, and the step of obtaining indicators of how much transmission power is allowed to be used by each stream may comprises using a predefined rule to split the serving grant between the two output streams.

The step of obtaining indicators of how much transmission power is allowed to be used may comprise receiving serving grants for each one of the two output streams.

The step of determining may comprise determining which one of the two output streams is to be a primary output stream and which one of the two output streams is to be the secondary output stream based on a configuration previously received using Radio Resource Control.

The step of determining may comprise determining which one of the two output streams is to be a primary output stream and which one of the two output streams is to be the secondary output stream based on a message received from the serving Node-B.

The message received from the Node-B may is a message received over a High Speed Shared Control Channel.

The step of determining may comprise determining which one of the two output streams is to be a primary output stream and which one of the two output streams is to be the secondary output stream based on a received pre-coding parameter.

The step of determining may comprise determining the primary output stream to be the output stream with the lowest associated transmission power for Dedicated Physical Control Channel.

The step of determining may comprise determining which one of the two output streams is to be a primary output stream and which one of the two output streams is to be the secondary output stream based on a configured value.

The step of determining may comprise determining the primary output stream to be the one of the two output streams which is associated with a pilot channel used for a single inner loop power control, ILPC.

The step of determining may comprise determining the primary output stream to be the one of the two output streams which is associated with High Speed Dedicated Physical Control Channel, HS-DPCCH.

The step of determining may involve the use of hysteresis.

The step of obtaining indicators of how much transmission power is allowed to be used for each one of two output streams may comprise: when a maximum transmission power assigned by the user equipment is less than the combined transmission power allowed to be used for the two output streams, reducing at least one of the indicators in order to correspond to the maximum transmission power assigned by the user equipment.

The maximum transmission power may be proportionally split between the indicators based on the value of the indicators.

The maximum transmission power may be split between the indicators based on serving grants associated with the two output streams.

The maximum transmission power may be split between the indicators based on the value of transmission power for Dedicated Physical Control Channel associated with each of the two output streams.

A second aspect is a user equipment arranged to be used in a mobile communication network for selecting an output stream for bits of a bit set. The user equipment comprises: a transmission power obtainer arranged to obtain indicators of how much transmission power is allowed to be used for each one of two output streams; a capacity calculator arranged to calculate a maximum number of bits that can be provided to each one of the two output streams in a preconfigured time period, based on the indicators; a primary and secondary output stream determiner arranged to determine which one of the two output streams is to be a primary output stream and which one of the two output streams is to be the secondary output stream; and an output stream selector. The output stream selector is arranged to: supply the bit set to the primary output stream when the number of bits that can be provided to the primary output stream is greater or equal to the number of bits in the bit set; and fill the primary output stream with bits from the bit set and providing the surplus of the bit set to the secondary output stream when the number of bits that can be provided to the primary output stream is less than the number of bits in the bit set.

A third aspect is a computer program for selecting an output stream for bits of a bit set. The computer program comprises computer program code which, when run on a user equipment of a mobile communication network, causes the user equipment to: obtain indicators of how much transmission power is allowed to be used for each one of two output streams; calculate a maximum number of bits that can be provided to each one of the two output streams in a preconfigured time period, based on the indicators; determine which one of the two output streams is to be a primary output stream and which one of the two output streams is to be the secondary output stream; when the maximum number of bits that can be provided to the primary output stream is greater or equal to the number of bits in the bit set, supply the bit set to the primary output stream; and when the maximum number of bits that can be provided to the primary output stream is less than the number of bits in the bit set, fill the primary output stream with bits from the bit set and providing the surplus of the bit set to the secondary output stream.

A fourth aspect is a computer program product comprising a computer program according to the third aspect and a computer readable means on which the computer program is stored.

It is to be noted that any feature of any aspect may be applied, where possible, to any other aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5b is a schematic diagram showing functional modules of the user equipment of FIGS. 1-3 and 5a.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
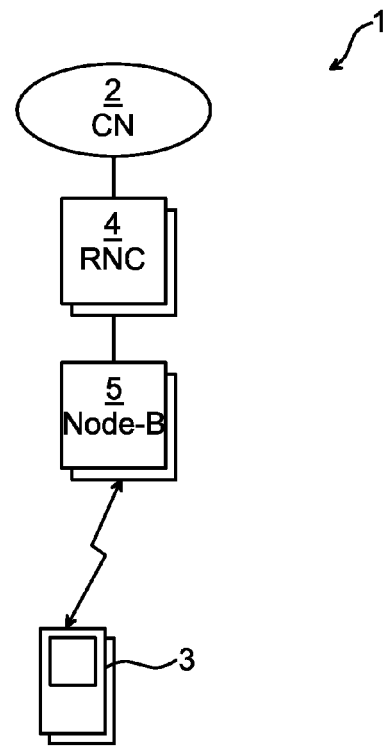
FIG. 1 is a schematic diagram illustrating a mobile communication network in which embodiments presented herein can be applied.

FIG. 1 is a schematic diagram illustrating a mobile communication network 1 in which embodiments presented herein can be applied. In the mobile communication network 1, there are one or more Node-Bs (or other suitable base stations) 5 shown. The mobile communication network 1 can comply with the W-CDMA standard of 3rd Generation Partnership Project (3GPP) or any other applicable standard. Hereinafter, references are on occasion made to channels and messages according to W-CDMA for completeness sake, but it is to be noted that this does not restrict the embodiments, which can be applied to any suitable standard.

The mobile communication network 1 can comprise any number of suitable Node-Bs 5. The mobile communication network further comprises one or more Radio Network Controllers (RNC) 4, where each RNC 4 serves one or more Node Bs and provides connectivity to a Core Network (CN) 2.

One or more mobile communication terminals 3, also known as user equipment (UE), are shown, where each UE 3 is mobile between the cells of the Node Bs of the mobile communication network 1 to achieve connectivity with the mobile communication network 1.

Figure 2:
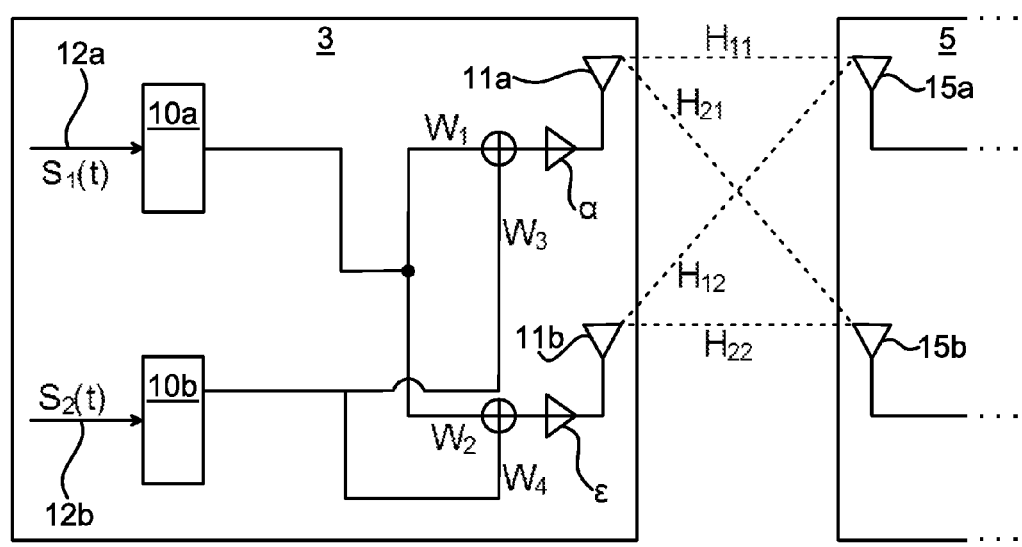
FIG. 2 is a schematic diagram illustrating communication between the user equipment and Node-B of FIG. 1.

FIG. 2 is a schematic diagram illustrating communication between the UE 3 and Node-B 5 of FIG. 1. The UE 3 comprises two separate inputs 12a-b for $S_1(t)$ and $S_2(t)$ respectively. Pre-coders 10a-b perform necessary pre-coding which are combined and provided to power amplifiers α, ε. The power amplifiers are in turn connected to a first transmit antenna 11a and a second transmit antenna 11b. The Node-B 5 also comprises a first receive antenna 15a and a second receive antenna 15b. It is to be noted that although two receive antennas are shown in this example, the embodiments presented herein are also applicable to Node-Bs comprising more than two receive antennas.

The model illustrated in FIG. 2 will now be presented in some more detail. MIMO technology is mainly beneficial in situations where the "channel" experienced by the UE is strong and has high rank. A model of the channel perceived by the UE is illustrated in FIG. 2. We highlight that the channel includes potential effects of the transmit antennas(s), PA inaccuracies as well as radio channel between the transmitting and receiving antennae. Letting $$H = \begin{bmatrix} h_{11} & h_{12} \\ h_{21} & h_{22} \end{bmatrix} \quad (1)$$

denote the channel matrix (here $h_{12}$ denotes the wireless channel between the second transmit antenna 11b and the first receive antenna 15a) and $$\Omega = \begin{bmatrix} \kappa & 0 \\ 0 & \eta \end{bmatrix} \quad (2)$$

represent a matrix that describes the inaccuracies of the power amplifiers (PAs). Here $\kappa$ is a random variable that models the inaccuracy associated with the first PA while $\eta$ is another random variable describing the inaccuracy associated with the other PA. Moreover we let the matrix $$\Phi = \begin{bmatrix} \phi_{11} & \phi_{12} \\ \phi_{21} & \phi_{22} \end{bmatrix} \quad (3)$$

describe the far-field antenna gain associated with the different links (here $\phi_{12}$ denotes the antenna gain associated with the link between the second transmit antenna 11b and the first receive antenna 15a). We notice that if there is a small angular spread in the channel $\phi_{11} \approx \phi_{21}$ and $\phi_{21} \approx \phi_{22}$.

Finally we also let $$W = \begin{bmatrix} w_1 & w_3 \\ w_2 & w_4 \end{bmatrix} \quad (4)$$

represent the pre-coding matrix where $[w_1\ w_2]$ is the primary pre-coding vector. With the notations introduced above, the received signal at the Node-B $[r_1\ r_2]$ can be written as $$r = \Phi \cdot H \cdot \Omega \cdot W \cdot s \quad (5)$$

where $s = [s_1(t)\ s_2(t)]$ are the two signals transmitted from each of the virtual antennas, '·' denotes the Hadamard multiplication and $\Phi \cdot H \cdot \Omega$ denotes the "channel" mentioned experienced by the UE.

In situations where the rank of the channel is low (e.g. where there is a limited amount of multi-path propagation and cross polarized antennas are not used) and/or the path gain is weak, single stream transmissions (beam forming techniques) are generally preferable.

Uplink MIMO has recently been standardized for LTE-A (Long Term Evolution Advanced). During this work it was decided that only the pre-coding vectors $w_1 = [1\ 0]$ and $w_2 = [0\ 1]$ are supported for dual stream transmissions. For this particular scenario all data associated with a first stream (second stream) is transmitted from the first physical antenna 11a (second physical antenna 11b). In other words the virtual and physical antennas coincide. One motive for this design choice was to keep the cubic metric (and the related power back off) at a reasonable level. As the same line of reasoning is applicable for HSUPA (High-Speed Uplink Packet Access) operation, and UE vendors may want to reuse the similar principles for WCDMA/HSPA UEs supporting uplink MIMO, it is not unreasonable that in some situations only these pre-coding vectors are supported for WCDMA/HSUPA.

Multi-antenna transmit diversity techniques (e.g. uplink MIMO and closed loop beam forming) can increase the coverage and capacity. However, when multiple streams are transmitted by the UE, this will create additional inter-stream interference at the Node-B receiver. The increased interference level will lower the instantaneous data rates (since more interference is seen by the receiver) and increase the amount of DPCCH (Dedicated Physical Control Channel) power that the UE needs to transmit with (also this will reduce the achievable data rates since less power is available for E-DPDCH (E-DCH Dedicated Physical Data Channel) transmissions). This problem will be particularly severe in situations where the Node-B does not use interference suppressing or interference cancelling receivers and instead rely on e.g. a rake receiver. With pre-coding vectors where each of the streams is transmitted from one antenna only, as previous noted in other study items [2] incorporating multi-antenna uplink transmissions, the far-field antenna pattern of the two transmit antennas can differ significantly (i.e. the elements in the matrix $\Phi$). This will result in that the quality associated with each of the two streams may differ significantly. Hence, there are good reasons to design uplink MIMO in a way so that the inter-stream interference is reduced or even minimized.

Even though orthogonal pre-coding vectors are employed by the UE there will exist inter-stream interference, e.g. due to the time-dispersion in the wireless channel. Additionally when pre-coding vectors such that the virtual and physical antennas do not coincide are used, one of the pre-coding vectors will generally be associated with higher link-efficiency than the other (e.g. if the first pre-coding vector is matched to the channel and the second is chosen so that it is orthogonal to the primary beam). Hence, also when these types of pre-coding vectors are employed there are good reasons to design uplink MIMO in a way so that the inter-stream interference is "minimized" and the overall, aggregate link efficiency is maximized.

It is also desirable to design uplink MIMO, perhaps in the E-TFC (E-DCH Transmission Format Combination) selection, in a way so that the UE behaviour is predictable and stable from the Node-B perspective. To give an example, if the UE has received grant(s) so high that it is power limited (i.e. if the transmit power with which the UE has been granted to transmit with by the network exceeds the UE's maximum transmit power) it is desirable if the UE allocates a similar power level to the two streams in adjacent sub-frames (given that the conditions are similar). This is because:

This will reduce the variations in the interference estimates and the complexity of the scheduler since this would allow the scheduler to treat the grants of the streams in an isolated manner.

The inter-stream interference caused by the E-DPDCH transmissions on the two streams in different sub-frames is similar. This will increase the stability of the closed control loops, e.g. the inner loop power control (ILPC) used for ensuring an adequate data transmission quality.

Furthermore we notice that the gains from MIMO operation in general stem from that the UE can avoid power inefficient high order modulations. Hence, it is desirable that the E-TFC selection procedure for uplink MIMO is designed in such a way that these can be avoided or minimized.

The embodiments presented herein provide the following methods:

The UE divides the total available transmit power available for E-DPDCH transmissions between the two streams based on at least one of the serving grant, scheduled grant, or DPCCH transmit power.

Based on the computed power levels for each of the streams the UE computes the maximum number of bits that can be transferred on each of two streams ("transport block sizes")

Given the computed number of bits that can be carried by the two streams the UE allocates the data in a sequential manner based on some pre-defined criteria. This minimizes the inter-stream interference received by the Node-B.

The UE and/or network dynamically can control which of the two virtual antennas ("streams") that the UE starts to allocate its data to. Since the UE allocates data to the streams sequentially this will maximize the probability of transmitting from the most efficient transmit antenna (i.e. the aggregated link efficiency can be maximized).

Figure 3:
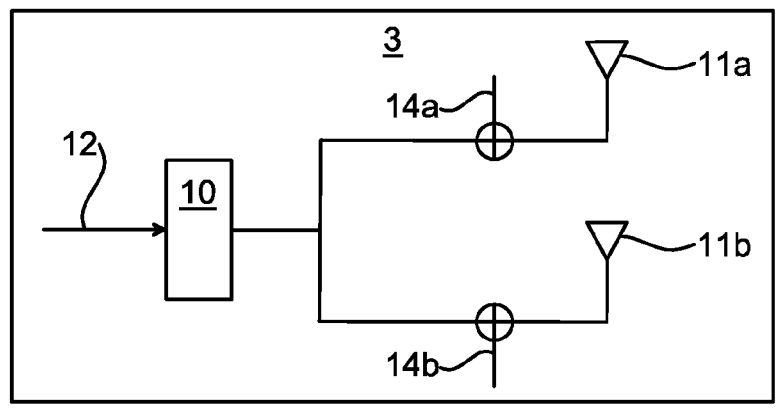
FIG. 3 is a schematic diagram illustrating transmitter components of the user equipment according to FIGS. 1 and 2.

FIG. 3 is a schematic diagram illustrating transmitter components of the UE of FIGS. 1 and 2. An input signal 12 is provided to a pre-coder 10 which distributes its result to two transmitter antennas 11a-b. There are two further possible respective inputs 14a-b, where applied signals are mixed with the precoded signals prior to transmission. This diagram can be used to illustrate two possible UE architectures for closed loop antenna switching and closed loop beam forming. In a first architecture, one of the two DPCCHs and all of the other physical channels are transmitted using a primary beam while in a second architecture, the pre-coding weights only are applied to the data related channels.

Embodiments presented herein are applicable to both single-cell and dual-cell WCDMA/HSUPA systems (and possible future carrier aggregation solutions). Furthermore, although the embodiments presented herein are described in a context of a UE equipped with two transmit antennas and a Node-B equipped with two receive antennas and for the UE architecture described in FIG. 2, the embodiments presented herein are applicable to settings with a larger number of transmit and receive antennas.

Some advantages of the embodiments presented herein are the ability to

Minimize inter-stream interference when dual stream transmissions are used by the UE while still maximizing the link efficiency.

Allow the network and/or UE to account for potential effects in the far-field antenna pattern.

Enable the network to minimize the interference and overhead by dynamically deactivating transmissions on the secondary virtual antenna in situations where the rank of the channel is small.

In the description below we will make use of the following definitions for primary output stream and secondary output stream:

The primary output stream refers to the stream that the UE starts allocating E-DCH data to. Note further that we will use the terms primary output stream, primary beam and primary virtual antenna in an interchangeable manner.

The secondary output stream refers to the other stream, which the UE does not start to allocate data to. We will use the terms secondary output stream, secondary beam and secondary virtual antenna in an interchangeable manner.

Note that throughout the description it is assumed that the UE allocates data to the primary output stream up to a certain pre-defined level. Thereafter the UE starts to allocate data to the secondary output stream. Also this is done to a predefined level. Once this level is reached the UE may potentially continue to allocate the primary output stream again. We stress that thresholds could either be predefined or signalled by the network (this will be further discussed further below).

Regardless of how data bits are divided, there will be situations where one stream is preferred over the other.

E-TFC selection is the process through which the UE select the transport block size that it should use in a sub-frame. As input parameters the UE utilize the serving grant (SG), which in turn is controlled by the network via the absolute and relative grants transmitted over the E-AGCH (E-DCH Absolute Grant Channel) and E-RGCH (E-DCH Relative Grant Channel). For legacy operation where there is only one transport block transmitted per carrier, the SG describes the ratio between the (filtered) DPCCH transmit power and the transmit power that the UE can use for E-DPDCH transmissions, i.e. $P_{E\text{-}DPDCH} = SG \cdot P_{DPCCH}$.

In dual stream transmissions, two DPCCH pilots will be needed for channel estimation and channel sounding. These DPCCHs will hereon forth be referred to as the primary DPCCH (P-DPCCH) and secondary DPCCH (S-DPCCH) or alternatively DPCCH1 and DPCCH2. It is here assumed that the scheduling algorithm (through which the network issues grants for the two streams; either implicitly or explicitly) may result in two serving grants SG1 and SG2. Each of SG will be applicable to one stream respectively. One may note that for the case where there only is one ILPC that controls the transmit power of both the P-DPCCH and S-DPCCH then $$P_{E\text{-}DPDCH,1} = SG1 \cdot P_{DPCCH,1} \quad \text{and}$$
$$P_{E\text{-}DPDCH,2} = SG2 \cdot \tau \cdot P_{DPCCH,1} \tag{6}$$

where $\tau$ is an arbitrary constant. If there are two ILPCs, the relationship is given as $$P_{E\text{-}DPDCH,1} = SG1 \cdot P_{DPCCH,1} \quad \text{and}$$
$$P_{E\text{-}DPDCH,2} = SG2 \cdot P_{DPCCH,2} \tag{7}$$

Note that for the latter, $P_{E\text{-}DPDCH,2}$ can be based on the S-DPCCH since both of P-DPCCH and S-DPCCH are power controlled independently.

In the following the two SGs are used as input in the proposed E-TFC method and it should be noted that all concepts described below are applicable irrespectively of whether one or two ILPC are used.

In the first main embodiment the UE starts by determining the E-TFC for the primary beam based on the SG1 according to legacy procedures. This will result in that a total amount of power P1 is allocated to primary beam. Given that, the UE has remaining power available for the secondary beam (i.e. $P_{tot} - P_1 - P_{other\ channels} > P_{DPCCH,2}$) and data available the UE determines the E-TFC for the secondary output stream. (Note that $P_{other\ channels}$ here describes the power allocated to other transmissions such HS-PDCCH or non-scheduled). Subsequently, the UE allocates data to the other beam.

By allocating data to the data to the virtual antennas (streams) sequentially instead of, e.g. in parallel, the inter-stream interference will be minimized. In different embodiments presented herein the stream that the UE starts to allocate data to is Predetermined and semi-statically configured by the network. In this case it can be signalled to the UE by RRC or defined implicitly as the beam over which HS-DPCCH (High Speed Dedicated Physical Control Channel) and/or non-scheduled transmissions take place.

Controlled by the network in a dynamic manner. This would allow the network to change which of the two streams that is the primary output stream by means of e.g. HS-SCCH orders. This could be beneficial if no pre-coding is used for dual-stream transmissions (i.e. W is the identity matrix) since the far-field antenna pattern can vary significantly for the two antennas [2].

Signalled by the network implicitly by the pre-coding feedback. For example, if the relationship between pre-coding vectors that can be applied for dual-stream transmissions is such that the there exist a one-to-one relationship between the pre-coding vectors that a UE can use, then the signalled pre-coding vector (or corresponding codeword) could define the primary beam whereas the pre-coding vector that the UE derives (based on the on the PCI information signalled by the network) could be used to define the secondary beam.

The beam associated with lowest DPCCH transmit power. In this case the UE will start to fill the stream associated with the highest link efficiency.

The highest scheduled/serving grant.

One potential challenge with some of the embodiments ("criteria") mentioned above (e.g. the one according to which the UE starts to allocate data to the stream associated with the lowest DPCCH transmit power level) is that interference generated by the UE may vary very quickly. To a certain degree these effects can be mitigated by introducing a hysteresis margin or a timer whereby so called flip-flop behaviour can be mitigated. These values could be signalled by the S-RNC. Another potential challenge of embodiments described above is that when a UE is "power-limited", e.g. because the network has scheduled too high grants, the UE is likely to use power inefficient high order modulations. Another challenge associated with the embodiments in which the UE dynamically is allowed to change the beam to which it starts to allocate data is that this will result in larger DPCCH signal quality (e.g. SIR) variations. This will in turn make it harder for the power control to adjust transmission power and possibly gain factor offsets so that an adequate quality, BLER (Block Error Rate), can be maintained for the data transmissions.

In the second main embodiment the UE computes two fictitious grants for the two streams. In different embodiments the power split is based on:
The serving grants associated with the two streams,
The scheduled grant(s) associated with the two streams,
The DPCCH transmit power level associated with the two streams, or
combinations of the above. One example of a formula that could be used to compute the fictitious power level for stream i, Fi, is $$F_i = \frac{P_{E-DPDCH,i}}{P_{E-DPDCH,1} + P_{E-DPDCH,2}} P_{available} \quad (8)$$

where $P_{available}$ describes the total power level available for E-DPDCH transmissions.

Given Fi a fictitious grant $SG_{i,F}$ can be computed as $$SG_{i,F} = \min\left(\frac{F_i}{P_{DPCCH,i}}, SG_i\right) \quad (9)$$

Using the fictitious serving grants $SG_{i,F}$ the UE computes the number of bits that can be allocated to E-DPDCH transmissions for each of the specific stream. In different embodiments the UE starts to allocate data to the stream Predetermined and semi-statically configured by the network. In this case it can be conveyed to the UE by RRC signaling or defined implicitly as the beam through which HS-DPCCH and/or non-scheduled transmissions occur.

Controlled by the network in a dynamic manner. This would allow the network to change which of the two streams that is the primary output stream by means of HS-SCCH orders and it could for example be beneficial if no pre-coding is used for dual-stream transmissions since the far-field antenna pattern can vary significantly for the two antennas.

Signalled implicitly by the network via the pre-coding feedback. For example, if the relationship between pre-coding vectors that can be applied for dual-stream transmissions is such that the there exist a one-to-one relationship between the pre-coding vectors that a UE can use then the signalled pre-coding vector (or corresponding codeword) could define the primary beam whereas the pre-coding vector that the UE derives (based on the on the PCI information signalled by the network) could be used to define the secondary beam.

The beam associated with smallest DPCCH transmit power. In this case the UE will start to fill the stream associated with the highest link efficiency.

The highest scheduled/serving grant.

In the last embodiment, the serving Node-B controls whether the UE is allowed to perform dual stream transmissions. Aside from simply relying on the absolute grants— which is one alternative (in case there is separate and independent grant per stream)—it is proposed here that this can be controlled by explicit or implicit L1 signaling:

An example of explicit L1 signaling could be HS-SCCH orders whereby the Node-B could deactivate and active transmissions from the secondary output stream.

An example of implicit L1 signaling could be that certain each of the signalled PCI codeword has a one to one mapping to either single or dual stream transmissions. Upon receiving x≥1 single stream codewords the UE could interpret this as an order to deactivate transmissions one the secondary beam.

Alternatively to "deactivating" transmissions on the secondary beam the L1 could be interpreted as an indication that the UE should enter a mode in which the S-DPCCH only is transmitted sporadically. This would both free up E-AGCH and E-RGCH resources at the Node-B and alleviate the UE from being required to transmit DPCCH from both antennas.

Finally the serving Node-B could rely on HS-SCCH orders to signal that the UE should change its primary beam. Given that the non-scheduled data and HS-DPCCH transmissions this feature could be useful for ensuring that the quality of these, highly important channels always can be maintained. Moreover, if an E-TFC selection procedure in which the UE allocates data to the carriers sequentially (starting with the primary beam) this could be useful for maximizing the link efficiency.

Figure 4:
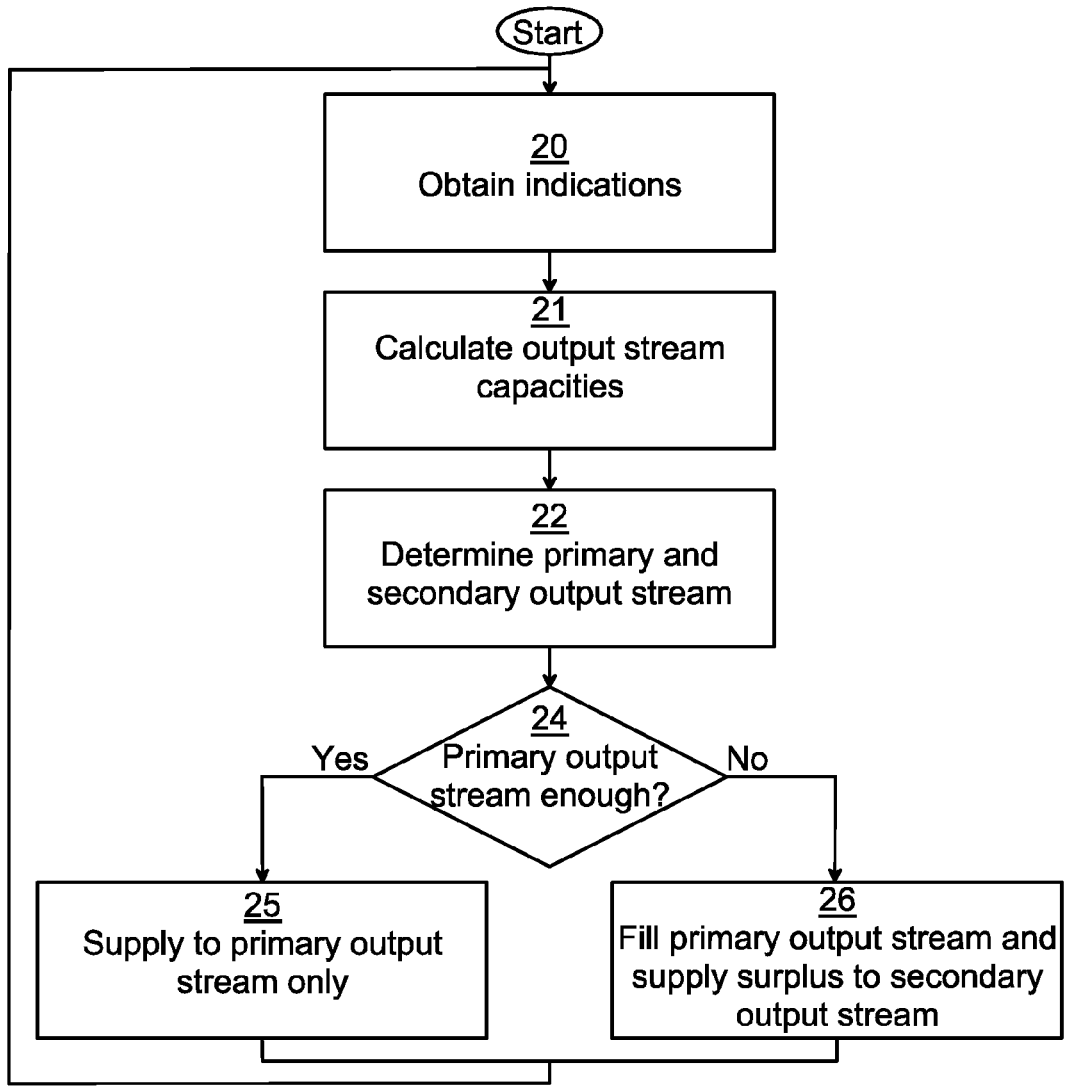
FIG. 4 is a flow chart illustrating a method according to embodiments presented herein executed in the user equipment of FIGS. 1-3.

FIG. 4 is a flow chart illustrating a method according to embodiments presented herein executed in the UE 3 of FIGS. 1-3. The method selects an output stream for bits of a bit set. The term bit set is simply a number of bits that are provided to be transmitted from the UE. It has previously been decided the order of transmission of the bits in the bit set and embodiments presented herein thus process a one dimensional bit set, which can be a seen as a queue of bits to be transmitted.

In an initial obtain indications step 20, indicators are obtained indicating of how much transmission power is allowed to be used for each one of two output streams. In one embodiment, the indicators can be, or be derived from, serving grants received from the serving node B. The serving grant can be a combined serving grant for both output streams, whereby a predefined rule can be used to split the serving grant between the two output streams. Alternatively, serving grants for each one of the two output streams can be received.

Optionally, when a maximum transmission power assigned by the user equipment is less than the combined transmission power allowed to be used for the two output streams, at least one of the indicators can be reduced in order to correspond to the maximum transmission power assigned by the user equipment. For example, the maximum transmission power can be proportionally split between the indicators based on the value of the indicators. Optionally, the maximum transmission power can be split between the indicators based on serving grants associated with the two output streams. In one embodiment, the maximum transmission power is split between the indicators based on the value of transmission power for Dedicated Physical Control Channel associated with each of the two output streams.

In a calculate output stream capacities step 21, a maximum number of bits that can be provided to each one of the two output streams in a preconfigured time period is calculated, based on the indicators. The preconfigured time period can be the duration of one sub-frame for HSUPA, e.g. 2 ms.

In a determine primary and secondary output stream step 22, it is determined which one of the two output streams is to be a primary output stream and which one of the two output streams is to be the secondary output stream. The primary output stream and the secondary output stream can later be provided to the MIMO transmitter comprising at least two transmitter antennas.

The determining which one of the two output streams is to be a primary output stream and which one of the two output streams is to be the secondary output stream, can be based on a configuration previously received using Radio Resource Control from an RNC node.

Optionally, the determining which one of the two output streams is to be a primary output stream and which one of the two output streams is to be the secondary output stream can be based on a message received from the serving Node-B. For example, the message received from the Node-B can be a message received over a High Speed Shared Control Channel.

Optionally, the determining which one of the two output streams is to be a primary output stream and which one of the two output streams is to be the secondary output stream can be based on a received pre-coding parameter.

Optionally, the primary output stream can be determined to be the output stream with the lowest associated transmission power for DPCCH.

Optionally, hysteresis can be applied to avoid unnecessary flip-flopping in which output stream is primary and secondary, respectively.

Optionally, the determining which one of the two output streams is to be a primary output stream and which one of the two output streams is to be the secondary output stream based on a configured value. In other words, the primary stream can be preconfigured and not based on the current situation. This is a simple and stable alternative.

Optionally, the primary output stream is determined to be the one of the two output streams which is associated with a pilot channel used, for when a single ILPC is used. The output stream associated with the pilot channel is power controlled, leading to a predetermined quality level, which is an advantage relative the other output stream which has an unpredictable quality.

Optionally, the primary output stream is determined to be the one of the two output streams which is associated with HS-DPCCH in the situation where there are two ILPCs. In this situation, both output streams are quality controlled. However, the stream is associated with HS-DPCCH is typically beam formed better than the other output stream, whereby it is advantageous to primarily use that output stream.

In a conditional primary output stream enough step 24, it is determined whether it is sufficient with the capacity of the primary output stream. If it is sufficient, the process continues to a supply to primary output stream only step 25. Otherwise, the process continues to a fill primary output stream and supply surplus to secondary output stream step 26.

In the supply to primary output stream only step 25, the bit set is supplied to the primary output stream only and nothing to the secondary output stream.

In the fill primary output stream and supply surplus to secondary output stream step 26, the primary output stream is first filled with bits from the bit set. Secondly, the surplus of the bit set is provided to the secondary output stream.

The process can be repeated.

Figure 5A:
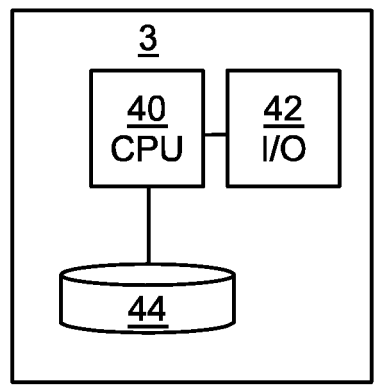
FIG. 5a is a schematic diagram of some components of the user equipment of FIGS. 1-3.

FIG. 5*a* is a schematic diagram of some components of the UE 3 of FIGS. 1-3. A controller 40 is provided using any suitable central processing unit (CPU), microcontroller, digital signal processor (DSP), etc., capable of executing software instructions stored in a computer program product 44, e.g. in the form of a memory. The computer program product 44 can be a memory or any combination of read and write memory (RAM) and read only memory (ROM). The memory also comprises persistent storage, which, for example, can be any single one or combination of magnetic memory, optical memory, or solid state memory or even remotely mounted memory.

An input/output (I/O) interface 42 is provided to allow the UE 3 communicate with the Node-B 5 and with a user of the UE 3. The UE also contains a number of conventional components which are not shown here in order not to obscure the ideas presented herein.

Figure 5B:
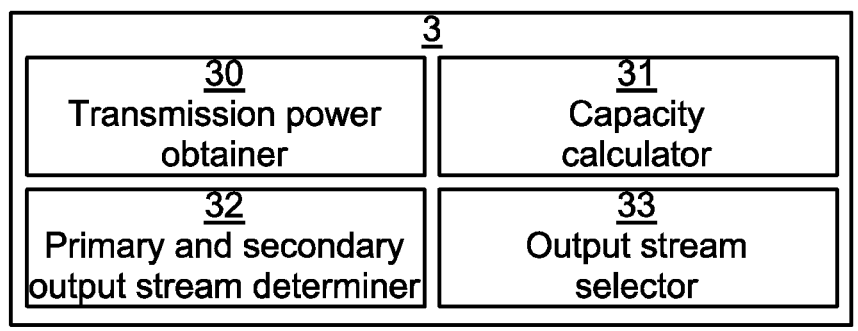

FIG. 5*b* is a schematic diagram showing functional modules of the UE 3 of FIGS. 1-3 and 5*a*. The modules can be implemented using software such as a computer program executing in the UE 3. All modules depend on an execution environment which utilises a controller 40, a computer program product 44 and an I/O interface 42. The modules correspond to steps of the method described above. Hence, not all aspects of the method steps are repeated here, but could equally well be applied to the modules described hereinafter.

A transmission power obtainer 30 is arranged to obtain indicators of how much transmission power is allowed to be used for each one of two output streams;

A capacity calculator 31 is arranged to calculate a maximum number of bits that can be provided to each one of the two output streams in a preconfigured time period, based on the indicators.

A primary and secondary output stream determiner 32 is arranged to determine which one of the two output streams is to be a primary output stream and which one of the two output streams is to be the secondary output stream.

An output stream selector (33) is arranged to supply the bit set to the primary output stream when the number of bits that can be provided to the primary output stream is greater or equal to the number of bits in the bit set. However, when the number of bits that can be provided to the primary output stream is less than the number of bits in the bit set this module first fills the primary output stream with bits from the bit set and then provides the surplus of the bit set to the secondary output stream.

Figure 6:
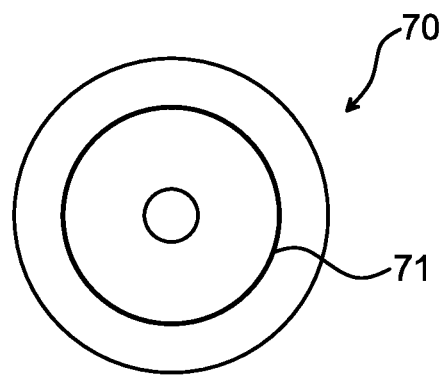
FIG. 6 shows one example of a computer program product comprising computer readable means.

FIG. 6 shows one example of a computer program product comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 44 of FIG. 5a. While the computer program 71 is here schematically shown as a track on the depicted optical disk, the computer program can be stored in any way which is suitable for the computer program product.

REFERENCES

[1] 3GPP TS 25.321 v8.6.0. Medium Access Control (MAC) protocol specification (Release 8).
[2] 3GPP TR 25.863, UTRA: Uplink Transmit Diversity for High Speed Packet Access.
[3] 3GPP RP-101438, "Uplink (Open-Loop and Closed-Loop) Transmit Diversity for HSPA"
[4] 3GPP RP-101432, "UL MIMO for HSPA"

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed in a user equipment of a mobile communication network for selecting an output stream for bits of a bit set, the method comprising:
   obtaining indicators of how much transmission power is allowed to be used for each one of two output streams;
   calculating a maximum number of bits that can be provided to each one of the two output streams in a preconfigured time period based on the indicators;
   determining which one of the two output streams is to be a primary output stream and which one of the two output streams is to be a secondary output stream;
   when the maximum number of bits that can be provided to the primary output stream is greater than or equal to the number of bits in the bit set, supplying the bit set to the primary output stream;
   when the maximum number of bits that can be provided to the primary output stream is less than the number of bits in the bit set, filling the primary output stream with bits from the bit set and providing the surplus of the bit set to the secondary output stream;
   wherein obtaining indicators of how much transmission power is allowed to be used for each one of two output streams comprises:
   when a maximum transmission power assigned by the user equipment is less than a combined transmission power allowed to be used for the two output streams, reducing at least one of the indicators in order to correspond to the maximum transmission power assigned by the user equipment; and
   proportionally splitting the maximum transmission power between the indicators based on a value of the indicators.

2. The method according to claim 1 further comprising providing the primary output stream and the secondary output stream to a multiple input multiple output (MIMO) transmitter comprising at least two transmitter antennas.

3. The method according to claim 1 wherein the preconfigured time period comprises the duration of one sub-frame for High Speed Uplink Packet Access.

4. The method according to claim 1 wherein obtaining indicators of how much transmission power is allowed to be used comprises receiving a serving grant from a serving Node-B.

5. The method according to claim 4: wherein the serving grant comprises a combined serving grant for both output streams; wherein obtaining indicators of how much transmission power is allowed to be used comprises using a predefined rule to split the combined serving grant between the two output streams.

6. The method according to claim 4 wherein obtaining indicators of how much transmission power is allowed to be used comprises receiving serving grants for each one of the two output streams.

7. The method according to claim 1 wherein the determining comprises determining which one of the two output streams is to be the primary output stream and which one of the two output streams is to be the secondary output stream based on a configuration previously received using Radio Resource Control.

8. The method according to claim 1 wherein the determining comprises determining which one of the two output streams is to be the primary output stream and which one of the two output streams is to be the secondary output stream based on a message received from a serving Node-B.

9. The method according to claim 8 wherein the message received from the serving Node-B comprises a message received over a High Speed Shared Control Channel.

10. The method according to claim 1 wherein the determining comprises determining which one of the two output streams is to be the primary output stream and which one of the two output streams is to be the secondary output stream based on a received pre-coding parameter.

11. The method according to claim 1 wherein the determining comprises determining the primary output stream to be the output stream with the lowest associated transmission power for Dedicated Physical Control Channel.

12. The method according to claim 1 wherein the determining comprises determining which one of the two output streams is to be the primary output stream and which one of the two output streams is to be the secondary output stream based on a configured value.

13. The method according to claim 1 wherein the determining comprises determining the primary output stream to be the one of the two output streams associated with a pilot channel used for a single inner loop power control.

14. The method according to claim 1 wherein the determining comprises determining the primary output stream to be the one of the two output streams associated with High Speed Dedicated Physical Control Channel.

15. The method according to claim 1 wherein the determining involves the use of hysteresis.

16. The method according to claim 4 further comprising splitting the maximum transmission power between the indicators based on serving grants associated with the two output streams.

17. The method according to claim 4 further comprising splitting the maximum transmission power between the indicators based on a transmission power value for a Dedicated Physical Control Channel associated with each of the two output streams.

18. A user equipment configured to be used in a mobile communication network for selecting an output stream for bits of a bit set, the user equipment comprising:
- a transmission power obtainer configured to obtain indicators of how much transmission power is allowed to be used for each one of two output streams;
- a capacity calculator configured to calculate a maximum number of bits that can be provided to each one of the two output streams in a preconfigured time period based on the indicators;
- a primary and secondary output stream determiner configured to determine which one of the two output streams is to be a primary output stream and which one of the two output streams is to be a secondary output stream;
- an output stream selector configured to:
  supply the bit set to the primary output stream when the maximum number of bits that can be provided to the primary output stream is greater than or equal to the number of bits in the bit set;
  fill the primary output stream with bits from the bit set and provide the surplus of the bit set to the secondary output stream when the maximum number of bits that can be provided to the primary output stream is less than the number of bits in the bit set;
- wherein obtaining indicators of how much transmission power is allowed to be used for each one of two output streams comprises:
  when a maximum transmission power assigned by the user equipment is less than a combined transmission power allowed to be used for the two output streams, reducing at least one of the indicators in order to correspond to the maximum transmission power assigned by the user equipment; and
  proportionally splitting the maximum transmission power between the indicators based on a value of the indicators.

19. A computer program stored in a non-transient computer readable medium for selecting an output stream for bits of a bit set, the computer program comprising computer program code which, when run on a user equipment of a mobile communication network, causes the user equipment to:
- obtain indicators of how much transmission power is allowed to be used for each one of two output streams;
- calculate a maximum number of bits that can be provided to each one of the two output streams in a preconfigured time period based on the indicators;
- determine which one of the two output streams is to be a primary output stream and which one of the two output streams is to be the secondary output stream;
- when the maximum number of bits that can be provided to the primary output stream is greater than or equal to the number of bits in the bit set, supply the bit set to the primary output stream;
- when the maximum number of bits that can be provided to the primary output stream is less than the number of bits in the bit set, fill the primary output stream with bits from the bit set and providing the surplus of the bit set to the secondary output stream;
- wherein obtaining indicators of how much transmission power is allowed to be used for each one of two output streams comprises:
- when a maximum transmission power assigned by the user equipment is less than a combined transmission power allowed to be used for the two output streams, reducing at least one of the indicators in order to correspond to the maximum transmission power assigned by the user equipment; and
- proportionally splitting the maximum transmission power between the indicators based on a value of the indicators.

\* \* \* \* \*